United States Patent
Allen

(10) Patent No.: US 6,859,756 B2
(45) Date of Patent: Feb. 22, 2005

(54) DIAGNOSTIC METHOD FOR MANUFACTURING PROCESSES

(75) Inventor: John R. Allen, Rye, NH (US)

(73) Assignee: Red X Holdings LLC, Anacortes, WA (US)

(*) Notice: Subject to any disclaimer, the term of this patent is extended or adjusted under 35 U.S.C. 154(b) by 0 days.

(21) Appl. No.: 10/236,450

(22) Filed: Sep. 6, 2002

(65) Prior Publication Data

US 2004/0049364 A1 Mar. 11, 2004

(51) Int. Cl.$^7$ .............................................. G06F 15/46
(52) U.S. Cl. ........................... 702/183; 702/81; 702/84; 702/182; 702/184; 702/185
(58) Field of Search ...................... 702/81–84, 182–185, 702/35, 155; 700/108–110, 164, 125

(56) References Cited

U.S. PATENT DOCUMENTS

| | | | | |
|---|---|---|---|---|
| 5,311,784 A | * | 5/1994 | Girard et al. ............... | 73/865.8 |
| 5,572,798 A | * | 11/1996 | Barnaby ...................... | 33/549 |
| 5,742,511 A | * | 4/1998 | Chasse et al. ................ | 700/98 |
| 5,963,881 A | * | 10/1999 | Kahn et al. .................... | 702/35 |
| 6,243,614 B1 | * | 6/2001 | Anderson .................... | 700/108 |
| 6,327,788 B1 | * | 12/2001 | Seddon et al. ................ | 33/551 |
| 6,594,590 B2 | * | 7/2003 | Woods et al. ................. | 702/35 |
| 6,604,295 B2 | * | 8/2003 | Nishimura et al. ........... | 33/554 |
| 6,622,102 B2 | * | 9/2003 | Skidmore ..................... | 702/84 |
| 2002/0022937 A1 | * | 2/2002 | Funakoshi .................... | 702/84 |

OTHER PUBLICATIONS

Title: World Class Quality, Author: Keki R. Bhote and Adi K. Bhote, Part III, pp. 105–230 and Part IV, pp. 231–332, Second Edition, Published 2000 by AMACOM, New York, ISBN 0–8144–0427–8.

* cited by examiner

Primary Examiner—Marc S Hoff
Assistant Examiner—Carol S Tsai
(74) Attorney, Agent, or Firm—White & Case LLP

(57) ABSTRACT

A method for use in a system for diagnosing the causes of manufacturing defects involves process characterization. A set of forms is identified for a workpiece and for a piece of manufacturing equipment that acts upon the workpiece. The forms for the workpiece are preferably a hierarchic set of geometric forms. Each such geometric form corresponds to an aspect of the action of the manufacturing equipment upon the workpiece. A plurality of measurements is made on a defective workpiece following the hierarchical order of forms. The measurements are compared to a reference datum, and a deviation from the datum is computed. If the deviation exceeds a preselected threshold, an alert condition results, attributable to the action of the manufacturing equipment. Targeted adjustment corresponding to the action that caused the defect can then be made to the equipment.

29 Claims, 13 Drawing Sheets

DIAGNOSTIC METHOD FOR MANUFACTURING PROCESSES

FIELD OF THE INVENTION

The invention relates to diagnostic analysis and, more particularly, to the diagnosis of manufacturing defects.

BACKGROUND OF THE INVENTION

Manufacturing processes, and the products they create, sometimes suffer from defects. The job of detecting and eliminating these defects falls to manufacturing engineers, who, over the years, have developed statistical approaches in an attempt to address them. They have also developed various controls, ranging from process control to quality control to product control, for attempting to capture defective products before they reach customers.

These controls are based on identification of limits on the capabilities of the various processes that are used in the manufacture of a workpiece or product. For example, process control is based on the capability of the process that produces the workpiece. An illustration is provided in FIGS. 1a and 1b, where shaft 10, produced on a lathe, has a nominal diameter 20, and a sampling of shafts has a distribution of diameters 30 at frequencies 40. The specified tolerance on the diameter dimension is identified by reference numeral 60 as shown in FIG. 1b. The range of the capability of the lathe is shown by numeral 50, where the capability may exceed that of the range of the specified tolerance. Shafts may have diameters exceeding the upper specification level (USL) 70, while others may have diameters below that of the lower specification level (LSL) 80 as shown in FIG. 1b. Parts that exceed the specifications, according to a quality control approach, would be rejected.

So-called quality control procedures are directed to preventing "out-of-spec" parts reaching customers, but they do not necessarily reduce the number of rejects. Rather, these approaches seek to distinguish good parts from bad based on product features that appear to be readily measured, without revealing mechanisms responsible for product defects or physical insights that could more readily lead to the discovery of such mechanisms.

SUMMARY OF THE INVENTION

The present invention provides approaches for identifying the causes of manufacturing problems by breaking down the different phases of a manufacturing process, such as the different actions of a machine tool on a workpiece, so that each phase or action can be related to the formation of an element or a feature of the final workpiece, preferably providing a one-to-one correspondence between the forming of the shape of the feature and a process step or action that produces the shape. This procedure, then, helps reveal defects which process action produces it. Once the source of the defect is detected, both the source and the workpiece defect it causes can be addressed.

The present invention provides not only a method for detecting defects in a manufacturing process, but also a method for identifying where in the process the defects occur, so that appropriate corrective action can be identified, and such action taken, at the point of occurrence. This object is accomplished by relying on a process characterization approach that focuses on the actual effect of the process on a workpiece.

In one embodiment of an aspect of the present invention, a method for use in a system for diagnosing the causes of deviation from an intended form in a workpiece produced by a manufacturing process is provided. At least one form is defined for the workpiece and for a piece of manufacturing equipment that acts upon the workpiece to impart the form. A plurality of measurements for each workpiece is defined, each relative to a respective reference datum. The subsequent steps involve generating a record of the plurality of measurements corresponding to each workpiece and inferring from the comparison of the measurements for at least one of the workpieces the existence of an alert condition associated with the action of the manufacturing equipment on the workpiece.

Another embodiment of an aspect of the present invention involves a method for identifying evidence of deviation from specification in a workpiece produced by a manufacturing process, the manufacturing process being performed by respective manufacturing equipment. The method includes identifying a set of repeated portions of the workpiece, each instance of a repeated portion having forms, the form of one instance of a repeated portion being substantially the same form as the other instances. For each instance of the repeated portion, a set of measurements of the reproducible part is made relative to a respective reference datum. Each set of measurements is compared to a respective target range of values. Based on the comparison, the existence of evidence of deviation from specification is inferred.

In still another embodiment of the present invention, a method for assessing a condition of a workpiece acted upon by manufacturing equipment starts by identifying a set of forms, each form corresponding to an aspect of the action of the manufacturing equipment upon the workpiece. The subsequent steps involve making a plurality of measurements for each form; computing, for each plurality of measurements, a respective deviation from a corresponding reference datum; defining a deviation threshold; and, if a computed deviation exceeds the deviation threshold, inferring the existence of the condition attributable to the action of the manufacturing equipment on the workpiece.

In yet another embodiment of an aspect of the present invention, a method is provided for detecting deviations from an intended form in a mechanical part. The deviations are detected on the basis of measurements of geometric properties relative to a reference datum, the geometric properties imparted by a machine tool operating on the mechanical part. The method comprises the steps of: identifying a hierarchic set of geometric forms characterizing the mechanical part, each form corresponding to an action of the machine tool on the part; categorizing the geometric forms from a lowest order to a highest order; making a plurality of measurements corresponding to the lowest order form; for each plurality of measurements, computing a respective deviation from a defining datum; checking for an alert condition for each of the respective deviations; and if an alert condition is present, inferring a deviation from the intended form.

In another embodiment of an aspect of the present invention, a method is provided for characterizing the ability of a machine tool to reproduce a product without deviating from a specification intended for at least a portion of the product, the characterization based upon taking geometric measurements. The method involves identifying a set of geometric forms present in the product; selecting a first of the set of geometric forms; making a plurality of measurements corresponding to the selected geometric form; for each plurality of measurements, computing a deviation from a respective reference datum; checking for an alert condition for each of the respective deviations; if an alert condition is present, adjusting the machine tool and repeating the method from the step of making additional measurements corresponding to the same selected geometric form iteratively until no further alert condition is found. If no alert condition is present, the method is repeated from the step of selecting the next set of geometric forms by incrementing to the next form until all geometric forms have been selected and no further alert condition is found.

The present invention also provides a method for representing measured deviations for features attributable to the forming of a physical object, in a suitable frame of reference. The method involves identifying an order for the features; providing a first region for comparing measurements corresponding to the features of the object; providing a second region associated with the first region; wherein the first region comprises frames of reference for the set of objects with respect to which the measurements are represented; and wherein, in the second region, the order of the object features is represented in correspondence with the measurements represented in the first region, and representing the measurements in a corresponding frames of reference, in conjunction with respective representations of the order of the measured objects.

BRIEF DESCRIPTION OF THE DRAWINGS

FIG. 2c is a cross-sectional view of the assembly of FIG. 2a.

FIG. 2d is a side view of the sleeve of FIG. 2a.

FIG. 8a is a condensed chart showing a hierarchical arrangement of the forms of the engine block deck of FIG. 7a.

DETAILED DESCRIPTION

Figure 1A:
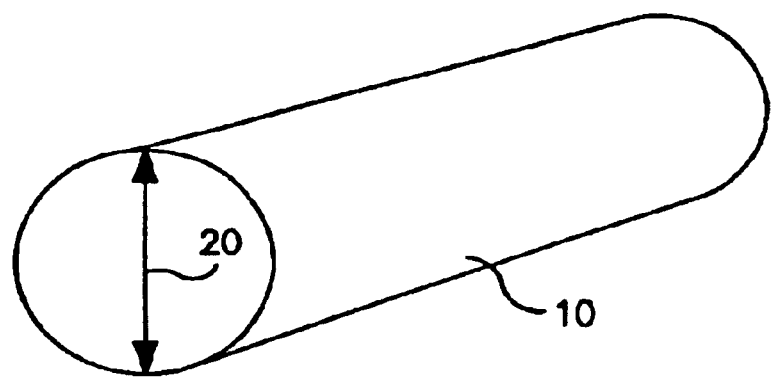
FIG. 1a shows a conventional shaft.
Figure 1B:
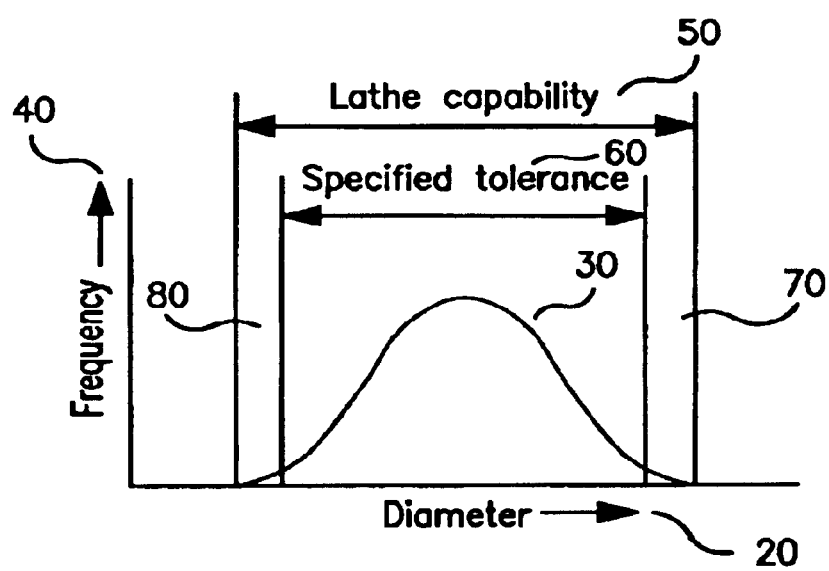
FIG. 1b is a frequency plot of a range of diameters of the shaft of FIG. 1a showing the range of capability of a lathe producing the shafts, and the range of tolerances, according to prior art.

The present invention provides a diagnostic method for detecting defects in a manufacturing process through an ability to control the process of creating shapes in a workpiece. A workpiece comprises elements, which may be portions and features, which are characterized by respective geometric forms. The method, broadly speaking, is accomplished through characterization of the manufacturing process, specifically characterizing the manufacturing process as a plurality of aspects or steps that correspond to actions involved in forming of the various elements of a work product. Then, actions of the manufacturing process associated with work product defects are identified. Where the manufacturing process involves forming a piece of hardware, an element of a workpiece may be a portion or feature of the workpiece characterized by a geometric form. Through a systematic and preferably (though not necessarily) hierarchically ordered set of measurements of the elements of an apparently defective product, one or more defective forms associated with the actions of the manufacturing equipment on the workpiece can be detected. In this manner, the source of a defect may be more efficiently and directly arrived at, and corrective action may more readily be taken at the point of occurrence of the defect.

According to an aspect of the present invention, a method for identifying geometric forms for a workpiece that is acted upon by manufacturing equipment begins by characterizing the process steps used in producing that workpiece or product. For this purpose, a flow diagram is constructed. Corresponding to each process step (that is, corresponding to each action of the machine tool) in the process flow diagram, a corresponding physical form of an aspect of the workpiece is identified and diagrammed. A practitioner may find it advantageous to begin this exercise with the least complicated geometric form that, together with successively higher order forms, identify the overall the relevant geometry of the workpiece. A form may, for example, be a set of points that define radii of a shaft, a set of radii that together define an arc of the shaft, a plurality of arcs that form circles (or closed curves, at any rate), and the set of circles that define the shaft, or a segment of it. Any variance of the actual workpiece data corresponding to a form, relative to a limit imposed by a specification, also referred to here as a reference datum, may provide evidence of a corresponding workpiece defect, the cause of which may be an aspect of the process step associated with that workpiece form. The overall variance of actual measurements from a datum can be distributed equally between the selected process steps, or allocated according to the expected influence of the forms on the functioning of the workpiece. However, no one form should be allocated more than 50% of the variance.

Accordingly, the geometric forms are measured. They may include, without limitation, radii, arc, closed curves (such as circles, ellipses, etc.) and surfaces. For each selected form, deviation of the allocated variance from the datum is computed. The form having the greatest degree of deviation is postulated to be associated with a defect responsible for causing the unacceptable variance from the datum. A defect, if of sufficient severity, may give rise to an alert condition. An alert conduction can be any condition recognized for the manufacturing process as one that may trigger an observation or other response from an entity with responsibility for at least some aspect of the process. An alert condition may be inferred, for example, if a deviation exceeds a defined threshold based on a preselected rule. The rule may vary depending upon the characteristics of the form. For example, for an arc, the rule may state the limits of the angle that subtends the arc. Attention can then be focused on the errant process step causing the unacceptable deviation, and an appropriate adjustment identified and implemented. Following one or more iterations of the adjustment process, the tendency of the machine tool to generate the detected defects can be remedied.

Figure 2A:
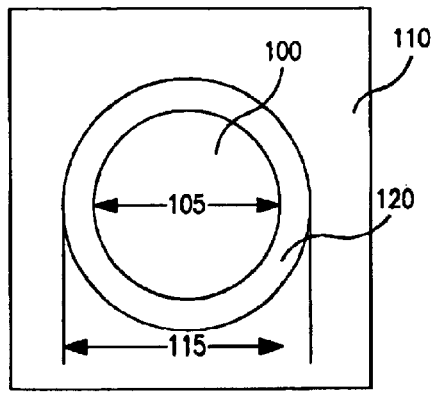
FIG. 2a is a top-view of an assembly of a shaft and its sleeve.
Figure 2D:
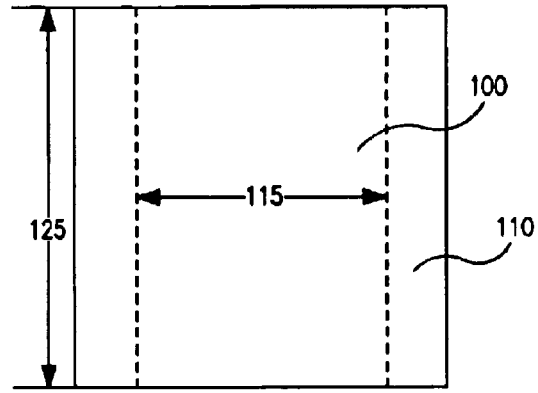
Figure 2B:
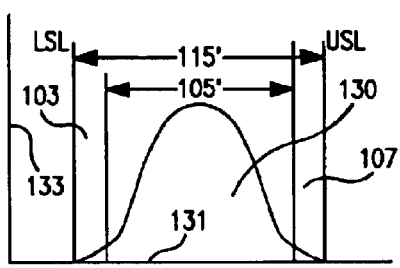
FIG. 2b is a frequency plot of a range of diameters of the shaft of FIG. 2a showing an upper specification level and a lower specification level.
Figure 2C:
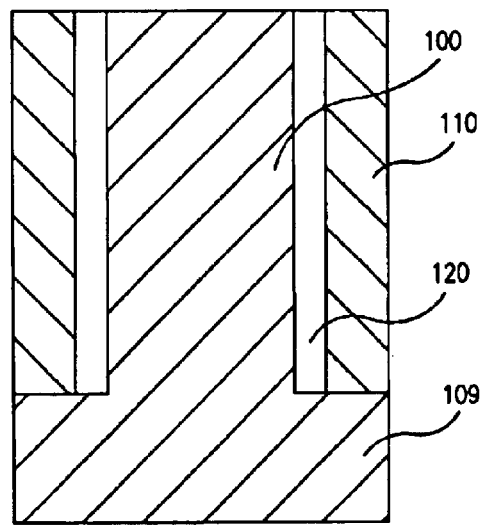

Aspects of an embodiment of a method according to the present invention are shown in FIGS. 2a–2f, in an example involving a malformed cylindrical shaft. FIG. 2a shows a top view of an assembly of shaft 100 in sleeve 110. The shaft and the sleeve are separated from one another by clearance 120. The nominal bore diameter of the sleeve is D 115, while the nominal diameter of the shaft is d 105. Acceptable ranges of diameters 105' and 115', within a set of specifications, are plotted in FIG. 2b. A lower specification level (LSL) 103, and an upper level specification (USL) 107 are shown schematically in the same FIG. 2b. A cross-sectional view of the shaft and sleeve are also shown in FIG. 2c for clarity. The shaft has a base 109, and both the sleeve and the shaft have the same length l 125.

Figure 2E:
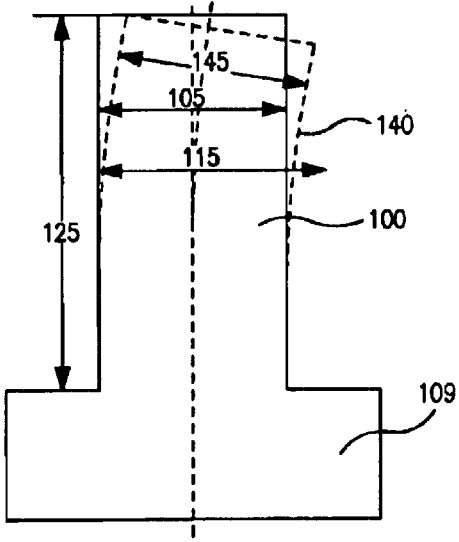
FIG. 2e is a side view of a defective shaft.

FIG. 2d shows a side view of sleeve 110, with shaft 100 withdrawn from the sleeve. The shaft itself is shown in FIG. 2e with its axis of revolution 104. FIG. 2e also shows a second shaft superimposed on the first shaft. Second shaft 140 is "out of true" at its free end opposite the base, that is, slightly out of shape as manufactured, though exaggerated in the drawing for illustrative purposes. Its axis of revolution is denoted as 144, and the shaft has a diameter d' 145. Measured along their respective axis of revolution, the diameter of both shafts, namely, d and d' fall within the specified tolerances and their lengths are the same. This is shown in FIG. 2e by superimposing the distribution of diameters of FIG. 2b along the extended axis of revolution 144 of shaft 140.

Having met the upper limit and lower level specifications, both shafts, therefore, are expected to pass quality control. At the same time, however, it is evident from FIG. 2e that, when shaft 140 is inserted into sleeve 110, it is not expected to rotate freely, as the "bent," or defective, portion of the shaft will be contacting the inside wall of the sleeve.

Figure 2F:
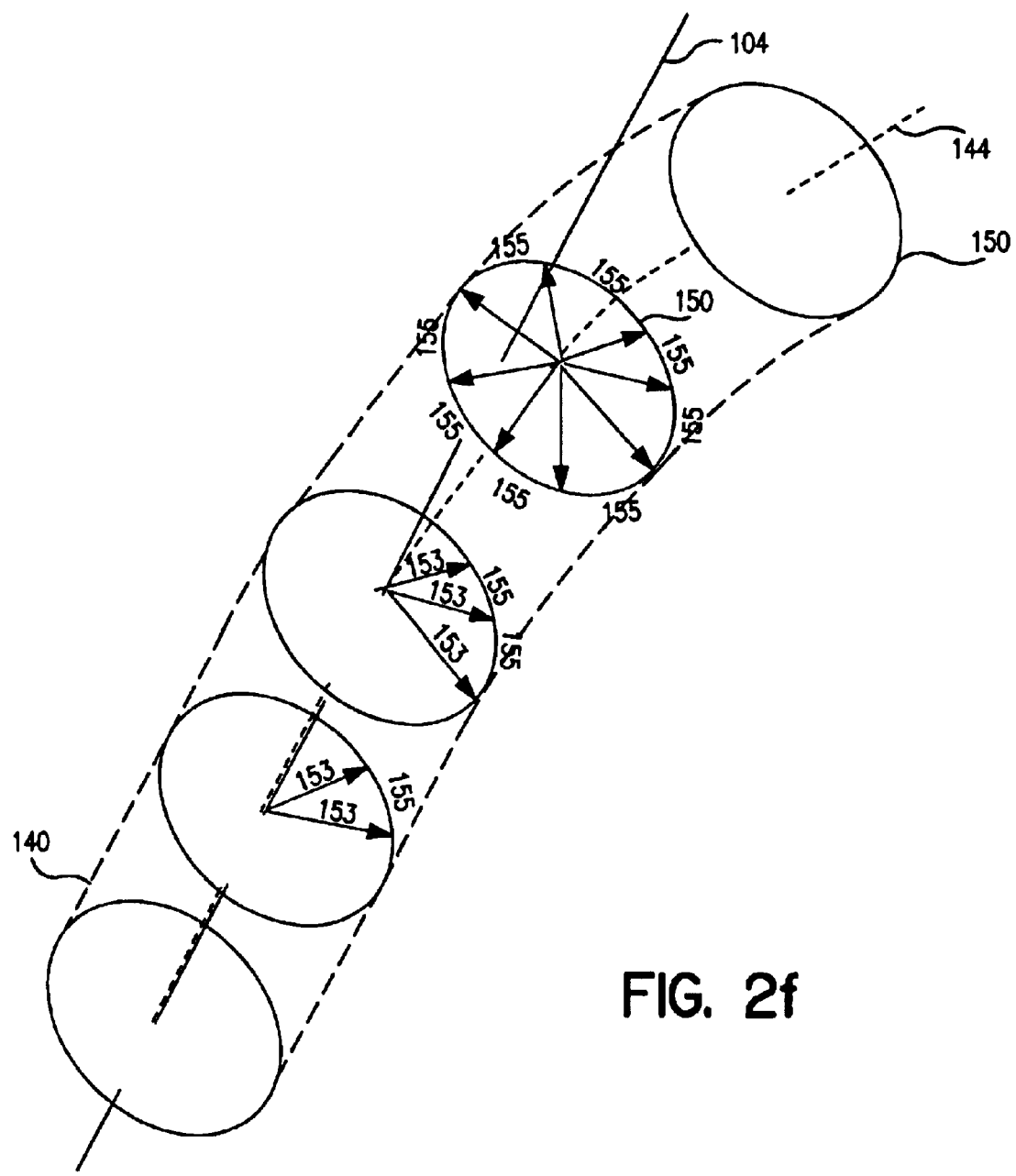
FIG. 2f is an enlarged view of the defective shaft of FIG. 2e showing various forms, in an embodiment of the present invention.

FIG. 2f shows an exploded isometric view of defective shaft 140. Examination of the shaft reveals that the radius form R 153 and the arc form S 155 in the plane of each of the circles C 150 are "true" within their respective specifications. Although all the forms, up to and including the circle form, meet their respective specifications, the cylinder form 140, generated by the repetitive action of a machine tool, such as a lathe, is out of true, its axis of revolution lying along 144 shown in FIG. 2f and not along axis 104. This condition requires a corrective action to adjust the action of the machine tool. Without a corrective action, the parts will not function properly, even though they will meet the overall quality control specifications as depicted in FIGS. 2b and 2e.

A need for corrective action can arise at any one of the steps described above. FIG. 3a shows another example of a defective shaft 300, a true cylinder with a straight axis of revolution 310, but also having a radius 301, which deviates beyond a threshold datum. Shown schematically in FIG. 3a, R has a nominal value, and R1 and R2 deviate substantially from that datum. At this point, the machine is adjusted before proceeding further with the production of the workpiece. Once this corrective action is taken, then other forms can be examined in an iterative manner until the entire defect-causing process steps are remedied.

Figure 3B:
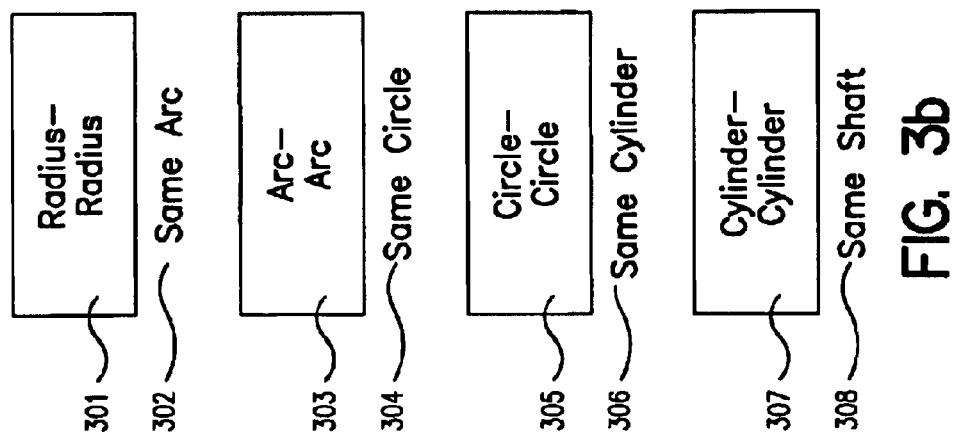
FIG. 3b shows a hierarchic arrangement of a category of geometric elements, or forms, in an embodiment of an aspect of the present invention.
Figure 3A:
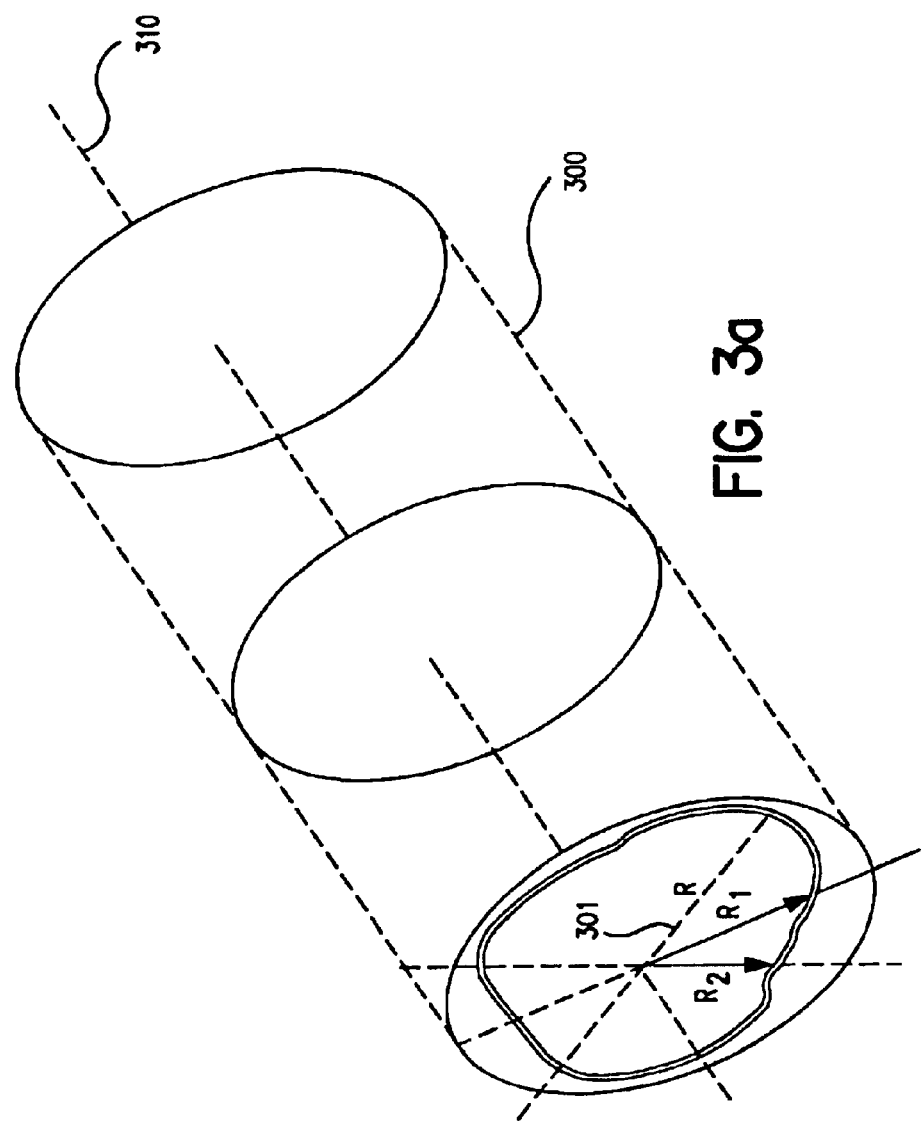
FIG. 3a is an isometric view of a shaft showing a defective cross-sectional area, according to the present invention.

In one embodiment, shown in FIG. 3b, geometric forms at each step are grouped together such that the same forms at a given step, when taken together constitute the next form, in a hierarchical fashion. Thus, radii 301, constitute the next higher order arc form 302. All radii 301 inscribe the same arc 302. Then, arcs taken together constitute circles, and circles together define a cylinder or shaft. The forms are shape elements, which together constitute more complex shapes. It is the difference, or deviation Δ, of the measured values of the forms from a reference datum at a given step that triggers an alert condition to which attention must be given. Accordingly, the process step corresponding to the form whose deviation gives rise to the alert condition that must be adjusted to eliminate that alert condition.

Figure 4:
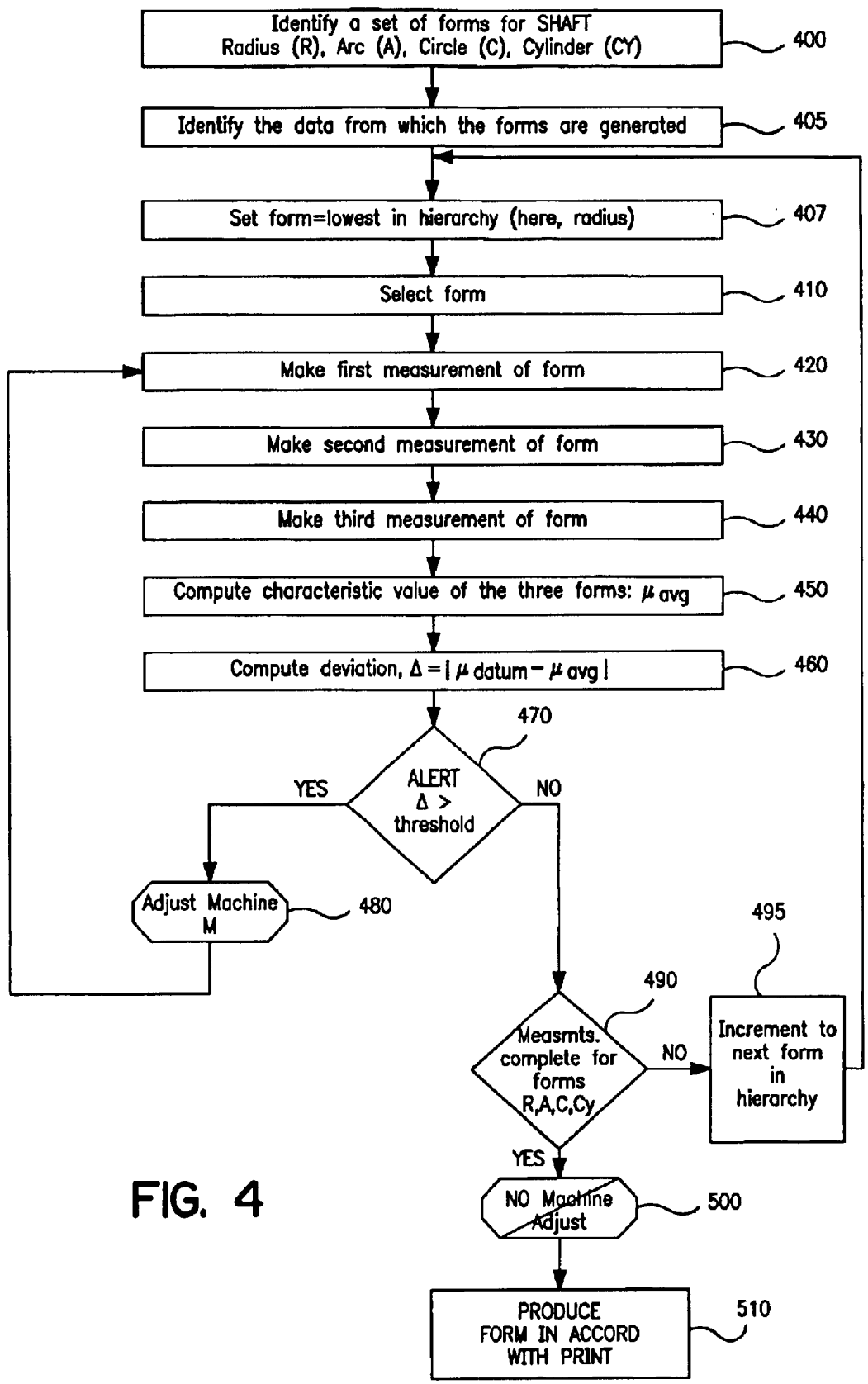
FIG. 4 is a flow diagram showing an embodiment of a method according to the present invention for diagnosing causes of defects in the manufacture of a shaft.

An embodiment of a method according to the present invention applied to the fabrication of a mechanical shaft is shown in the flow diagram of FIG. 4. A set of forms for a shaft in the same Figure is identified in step 400. The forms are the radius, arc, circle and cylinder. The data from which the forms are generated are identified 405. Then the form is set to that which is lowest in hierarchy 407, and the form is selected 410 (radius, in this case). Starting with the first selected form, three radii are measured at random (steps 420–440). A characteristic value, such as an average, $\mu$, of the three radii, is next calculated in step 450. Then, an absolute value of the difference between the characteristic value, $\mu_{avg.}$ and a given reference datum, or $\mu_{datum}$, is calculated. In step 460, the deviation of the characteristic value from the datum is compared with a threshold value. If the deviation is greater than the threshold value, then an alert condition 470 is declared. Consequently, the process step corresponding to the selected form, is adjusted at 480 and a new set of radii measurements is made (following steps 420–470) in an iterative fashion until alert condition is remedied.

When there is no alert condition, a second set of forms is selected at step 490 by incrementing to next form in hierarchy 495, and returning to step 410. In the example shown in FIG. 4, three measurements are made for the arc form, S. Then, steps 420–460 are repeated. If the deviation for the arc measurements exceeds a threshold value, step 470, then the action of the machine corresponding to the production of the form is adjusted accordingly at step 480. The process is continued iteratively for circle and cylinder forms until measurements for all forms are completed, any alert condition remedied, and until no further adjustment of the process machine is needed 500. At step 510, the machine is ready to produce forms according to a shop print, and, consequently, the workpiece should be defect-free.

Figure 5:
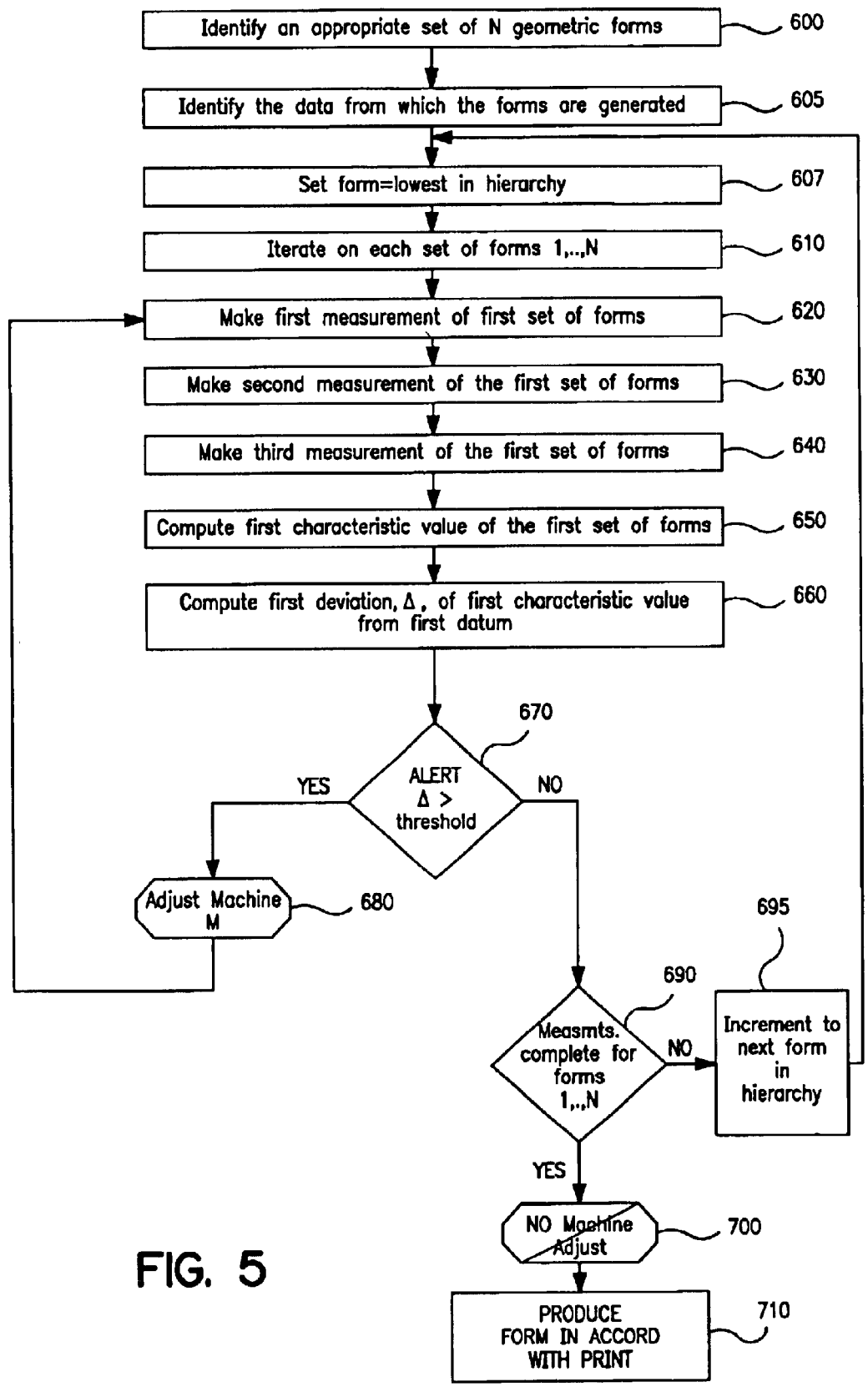
FIG. 5 is a flow diagram showing an embodiment of a method according to the present invention for diagnosing causes of defects in a manufacturing process.

FIG. 5, which shows steps 600–710, is a generalization of the process steps of FIG. 4, where there are N forms that make up a workpiece, or a product. A category of geometric form 600 comprises, in general, a curvilinear segment, a closed curve, or a surface. Another category can comprise spatial forms or temporal forms. The latter forms represent reproductive elements within which at least portions comprising geometric forms of a workpiece can be reproduced repeatedly and faithfully from location to location on a factory floor, or over a time interval of hours, days, or weeks.

In similar steps of FIG. 4, data from which the forms are generated are identified 605. Then the form is set to that which is lowest in hierarchy 607, and the form is selected 610. Starting with the first of the N forms, first measurement of first set of forms is performed 620. Second and third measurements are performed on the first set of forms 630 and 640, respectively. A characteristic value is next calculated in step 650. Then, the difference between the characteristic value and a given reference, or datum, is calculated. In step 660, the deviation of the characteristic value from the datum is compared with a threshold value. If the deviation is greater than the threshold value, then an alert condition 670 is declared. Consequently, the process step corresponding to the selected form, is adjusted at 680 and a new set of measurements is made (following steps 620–670) in an iterative fashion until alert condition is remedied.

When there is no alert condition, a second set of forms is selected at step 690 by incrementing to next form in hierarchy 695, and returning to step 610. Steps 620–660 are repeated. If the deviation for the measurements exceeds a threshold value, step 670, then the action of the machine corresponding to the production of the form is adjusted accordingly at step 680. The process is continued iteratively for the remaining forms until measurements for all forms are completed, any alert condition remedied, and until no further adjustment of the process machine is needed 700. At step 710, the machine is ready to produce forms according to a shop print, and, consequently, the workpiece should be defect-free.

Figure 6A:
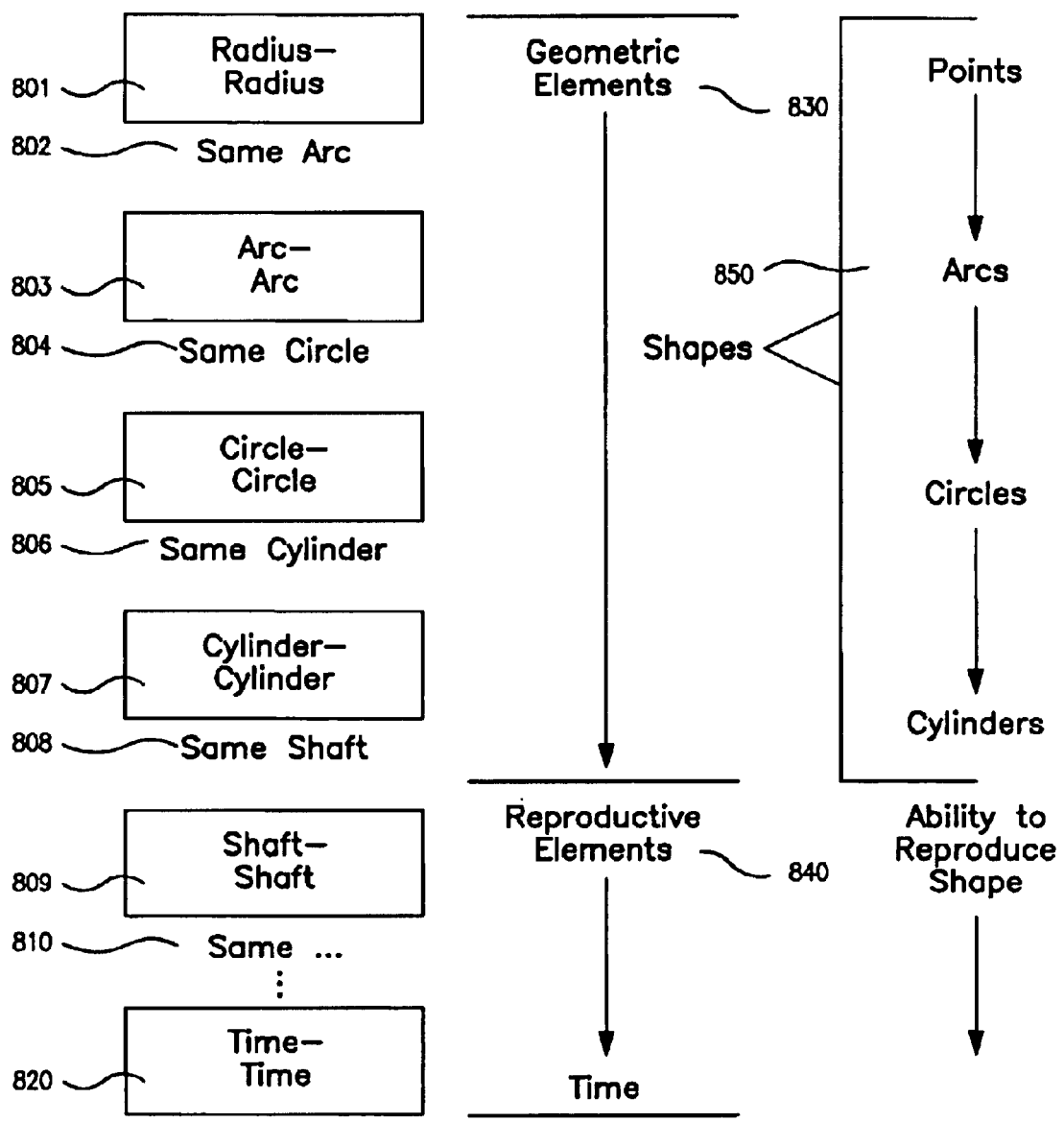
FIG. 6a shows an arrangement of geometric forms and reproductive forms, in an embodiment of the present invention.
Figure 6B:
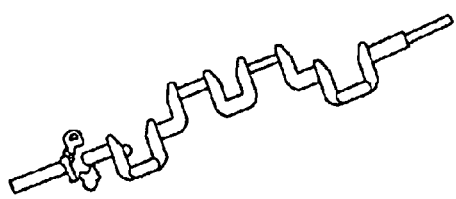
FIG. 6b shows a shaft and its housing.

FIG. 6a shows a recast of the geometric forms 830 of FIG. 3b for illustrative purposes. Geometric elements, or forms, in the form of shapes 850, form portions of, and the workpiece itself, such as the shaft shown in FIG. 6b. Reproductive forms, such as the locations where the shafts are made and the time intervals within which they are made, are all identified and assessed for alert conditions. The corresponding acts related to the manufacturing process are corrected to produce forms in accordance with a specified print to result in a defect free product. In order to achieve the reproducibility of a multiplicity of the same shaft in a period of time 840, the same analysis as shown in FIG. 5 is extended temporally to account for deviations from a datum where N includes time as a form.

In one embodiment, a method for identifying defects through a process characterization approach according to the present invention is described with reference to an example involving an automobile engine block deck 900, shown in FIGS. 7a–7h. The deck constitutes one-half of an engine block. After the other half (not shown) is sealed and bolted on, the engine block is readied for operation. As detected during operation, the engine block leaks oil. The method according to the present invention is applied to find the defect, so that the necessary adjustments to the machine tool that produced the engine block scan be appropriately adjusted to produce engine blocks that are defect free and do not leak oil.

Figure 7A:
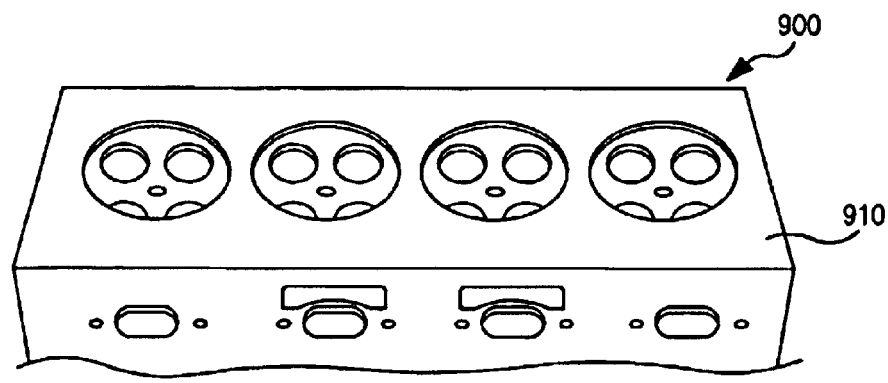
FIG. 7a is an isometric view of an engine block deck.
Figure 7B:
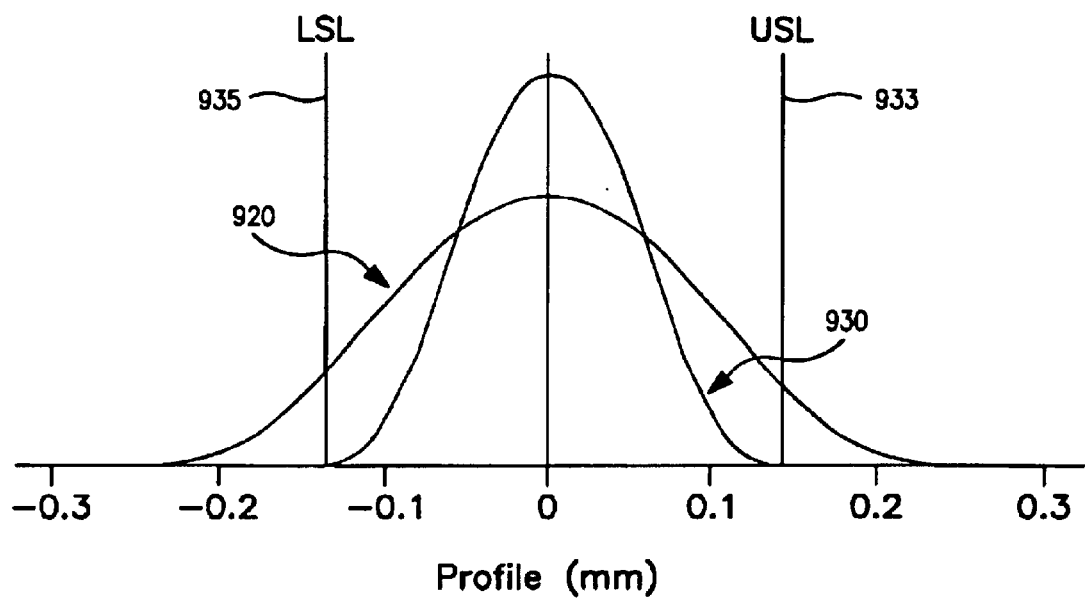
FIG. 7b is a graph of the distribution of measurements associated with surface profile of the engine block deck of FIG. 7a, in an embodiment of the present invention.
Figure 7C:
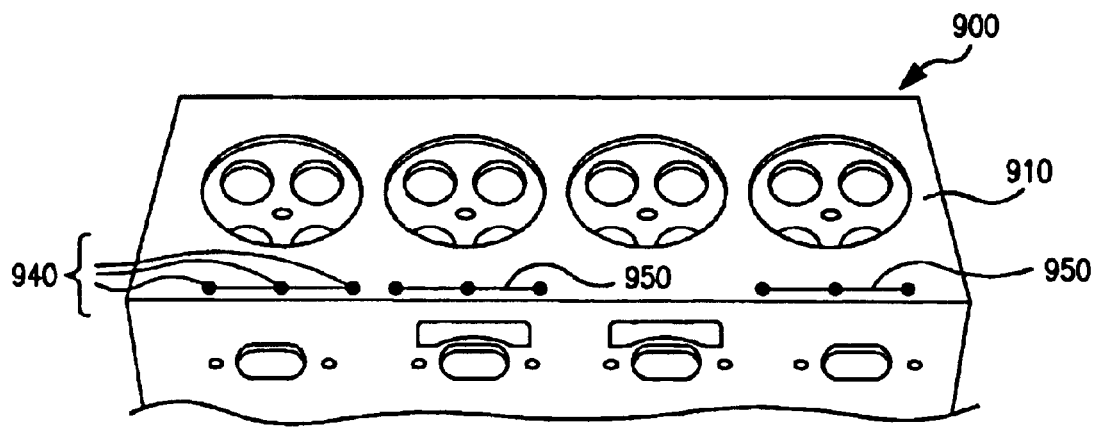
FIG. 7c is an isometric view of the engine block deck of FIG. 7a showing a definition of geometric forms as points measured with respect to the vertical dimension of the block and line segments defined by a set of points according to the present invention.
Figure 7D:
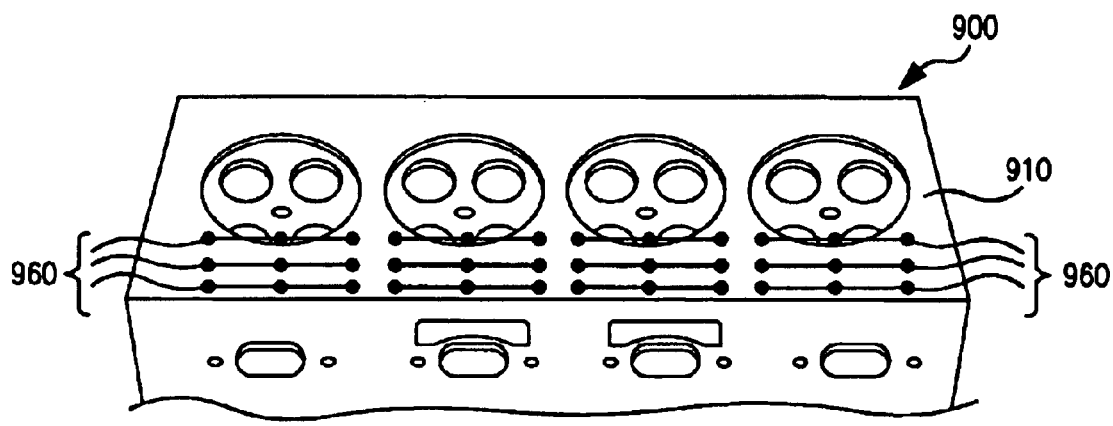
FIG. 7d is an isometric view of the engine block deck of FIG. 7a showing a definition of geometric forms as line elements, in an embodiment of the present invention.
Figure 7E:
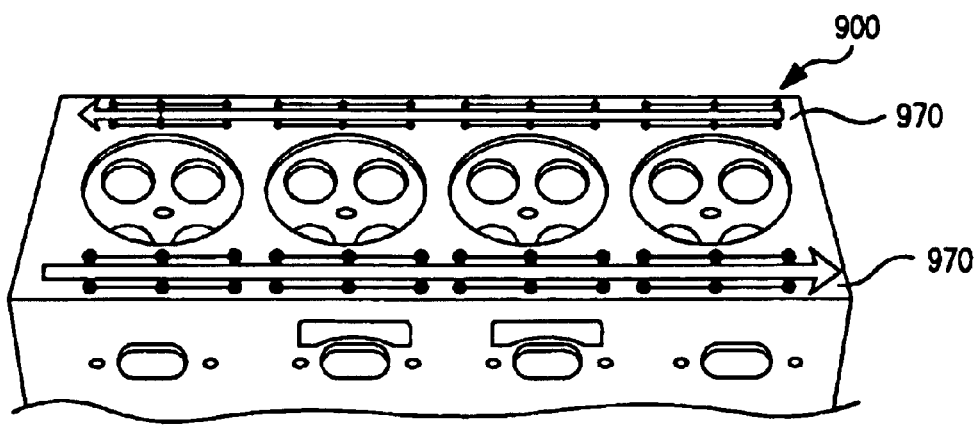
FIG. 7e is an isometric view of the engine block deck of FIG. 7a showing a definition of geometric forms in the form of pass elements in an embodiment of the present invention.
Figure 7F:
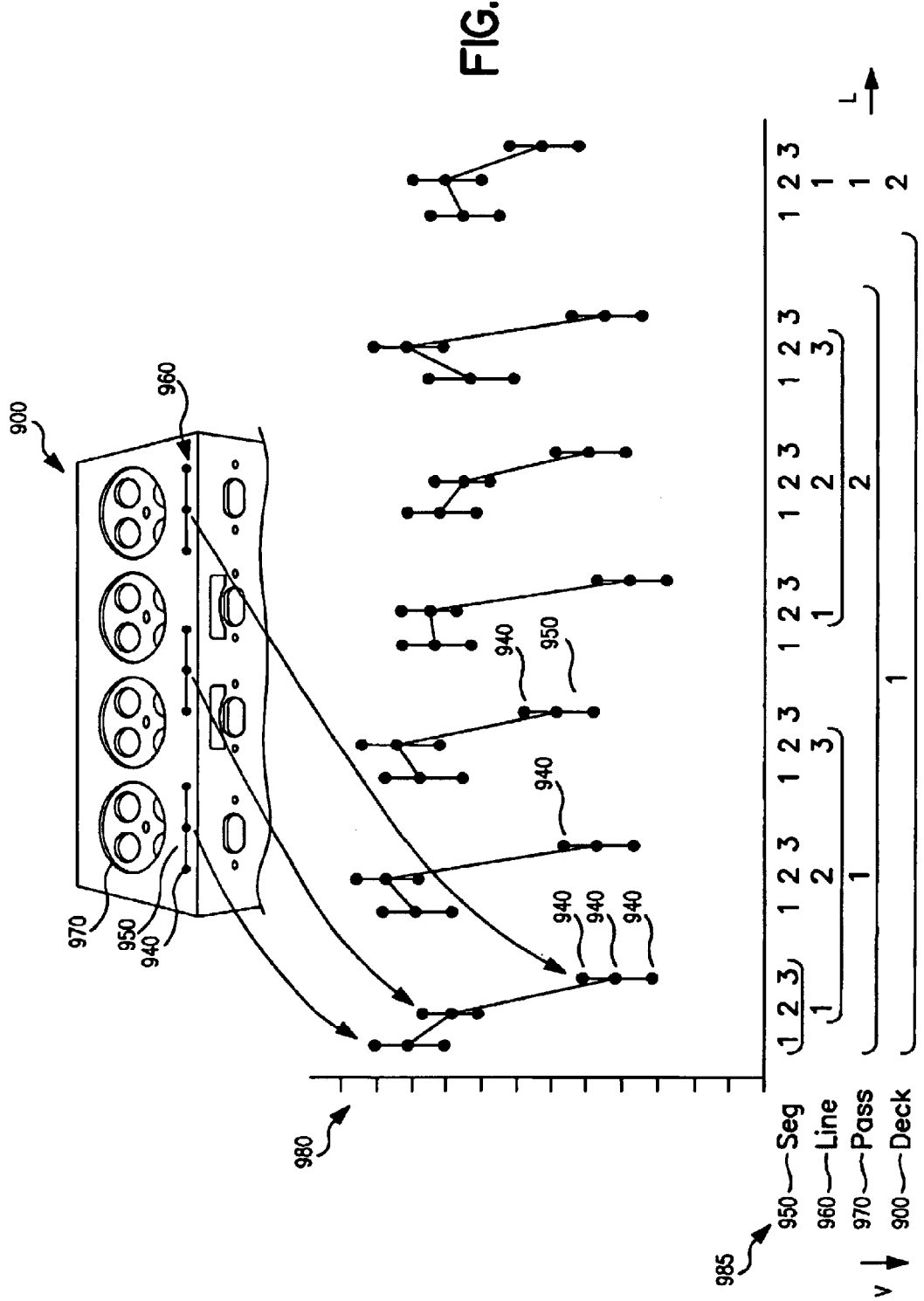
FIG. 7f is a multi-form chart, comprising a combination of a multi-form graph and a multi-form table showing the plot of the various elements, or geometric forms, that constitute the engine block deck of FIG. 7a, in an embodiment of the present invention.
Figure 7G:
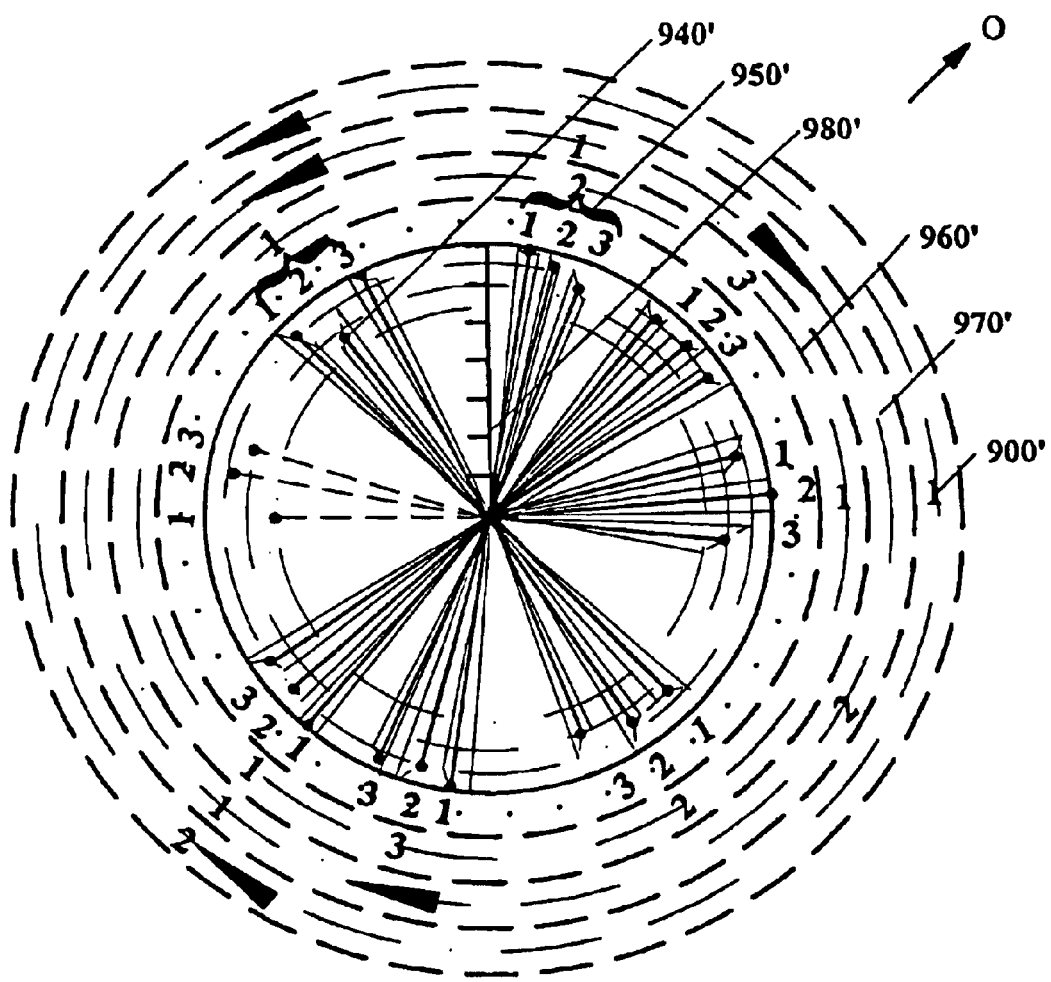
FIG. 7g is a generalized multi-form chart of FIG. 7h represented in polar coordinates.

A specified flatness profile for the deck surface 910 shown in FIG. 7a is plotted as graph 930 in FIG. 7b. The existing flatness profile of the deck is as shown in graph 920 of the same Figure. The deviation of the existing surface profile from the required surface profile well exceeds the upper speciation level (USL) 933 and the lower specification level (LSL) 935 as shown in the same FIG. 7b. In order to identify the process step or steps causing the defective surface profile, the various forms that constitute the deck are measured in a hierarchical order. The measurements are then subjected to a multi-form analysis using a multi-form deviation chart. A multi-form deviation chart of the present invention uses a multi-vari graph with additional features that will be further described below An examination of the block deck surface reveals that the simplest measurable forms that constitute the surface comprise: 1) a point on the surface, 2) line segments defined by a plurality of points, and 3) lines defined by line segments. Points 940 and line segments 950 are shown in FIG. 7c. Lines 960 are shown in FIG. 7d, where at least two lines form a planar surface 910. The planar surface of the deck is formed by one pass of the machine tool in a single direction 970, and by another pass 970 in the other direction, as shown in FIG. 7e. Once having identified the forms to be measured, the measurements are made accordingly. The measurements are then represented in a multi-form deviation chart as shown in FIG. 7f. The multi-form deviation chart comprises a combination of a multi-form graph 980 and a multi-form table 985 as shown in the same Figure.

In the illustrated embodiment shown in FIG. 7f, the multi-form deviation chart comprises a multivari plot of the data. Three data points are preferred for each of the selected forms. The measured values are plotted in a multi-form graph 980. However, before making the measurements, it is preferable that the selected forms are first tabulated in multi-form table 985 presented with the multi-form graph as shown in FIG. 7f. The spatial relationship between multi-form graph 980 and multi-form table can be contiguous or proximally adjacent. Thus, starting with one deck, two pass measurements are needed, since, at minimum, two passes are required to form one deck surface. Three lines constitute one pass so that three lines are measured for each pass. Finally, three line segments are measured for each line. Lowest order geometrical form "points" 940 define the next higher order geometrical form "line segment" 950. However, in defining geometric form "line" 960, "line segments" 950 are lower order forms with respect to 960. Likewise, form "pass" 970 is constituted by three "line" forms. That is, pass 970 occupies a higher order in the form hierarchy.

For multi-form analysis of additional engine block decks, the multi-form table and the accompanying multi-form graph are extended laterally L, and the measurements are repeated in exactly the same manner as described above. A continuation for a second deck is shown in FIG. 7f. Furthermore, for multi-form analysis of additional forms, such as for monitoring variations in decks manufactured at different stations/locations on the same manufacturing floor, which may be characterized as spatial variations, or for monitoring temporal variations in decks manufactured in certain periods of time, such as a given day, or week, the multi-form table can be extended vertically V to accommodate the additional forms.

Figure 8A:
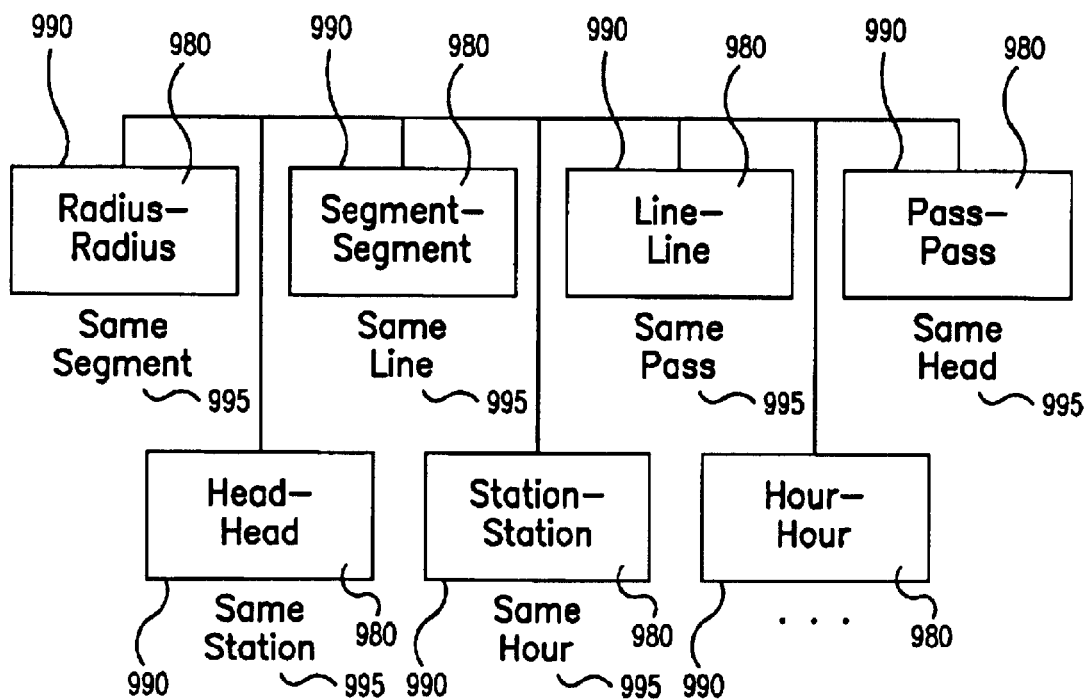

As shown in FIG. 7f, multi-form graph 980 and multi-form table 985 are presented together to form a multi-form deviation chart. Preferably, deviations from a reference datum are represented by the average of the measured values in each category of form, although other mathematical relationships can be employed. FIG. 7f is constructed using Cartesian coordinates. Other frames of reference can also be used. Thus, in FIG. 7g, polar coordinates are used. In the same Figure, reference numerals 900', 940', 950', 960', 970' and 980' correspond to the same unprimed reference numerals of FIG. 7f. The space inside the solid boundaries represents the multi-form graph region, and the dashed space outside the solid boundaries represents the region for placement of ordered forms. Additional ordered forms may be accommodated by expanding the polar space outwardly, O. A condensed table having additional forms is shown in FIG. 8a. Lower order forms 980 are shown in boxes 990, while higher order forms 995 are shown below those boxes.

Figure 8B:
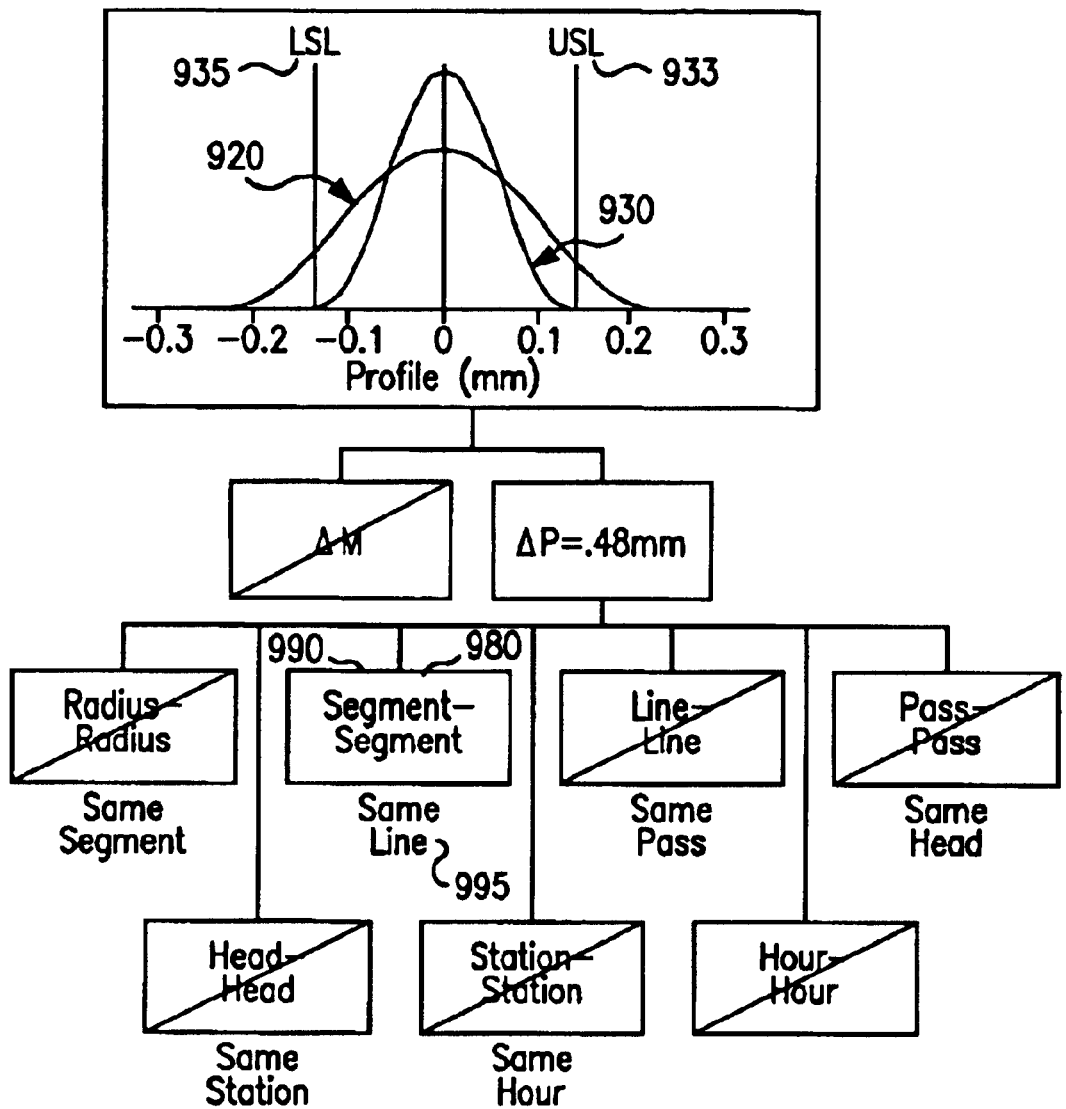
FIG. 8b shows the finding of an exemplary defect in one of the forms used in a graphic analysis of FIG. 7f.

An analysis of the data plotted in a multi-form deviation chart makes it possible to identify form(s) having the greatest variance, that is, with the accompanying alert condition. The methods of the present invention show that non-random alert conditions generally are most likely to appear, if at all, in geometrical forms. On the other hand, random alert conditions, when they occur, are mostly found in reproductive forms, such as in reproduced workpieces themselves, or in spatial or temporal forms. Accordingly, the corresponding process step(s) or action(s) of the manufacturing equipment is (are) adjusted. This is shown in FIG. 8b, where for illustrative purposes, a profile defect of about 0.48 mm is found in a line form comprising lower order line segment forms. Consequently, the process step (the action of a milling machine, for example) responsible for milling lines/line segments is adjusted accordingly so that the ensuing engine blocks are free of the previously detected defect, and no longer leak oil.

While the invention has been shown and described with reference to particular embodiments, those skilled in the art will understand that various changes in form and details of the methods according to the present invention may be made without departing form the spirit and scope of the invention.

What is claimed is:

1. A method for diagnosing a cause of deviation from an intended form in a workpiece produced by a manufacturing process, in which at least one form is defined for the workpiece and manufacturing equipment acts upon the workpiece according to the manufacturing process to impart the form, the method comprising the steps of:

defining a plurality of measurements for the workpiece, each relative to a respective reference datum;

taking the defined measurements for the workpiece;

generating a record of the measurements;

comparing the recorded measurements for each workpiece; and inferring from the comparison of the measurements the existence of an alert condition associated with the action of the manufacturing equipment on the workpiece, wherein the measurements correspond to a hierarchic set of forms characterizing the workpiece, each form corresponding to an action of the manufacturing equipment, wherein the hierarchic set of forms comprises two categories: a first category of forms characterizing the shape of a portion of the workpiece, and a second category of forms characterizing sets of portions of the workpiece.

2. The method according to claim 1, wherein the sets of portions of the workpiece comprise repeating portions.

3. The method according to claim 1, further comprising the step of plotting at least a subset of the recorded measurements in a graph prior to the step of inferring the existence of an alert condition.

4. The method according to claim 1, wherein the hierarchic set of forms comprises one selected from the group consisting of a point form, a path segment form, a path form and a surface form.

5. A method for identifying evidence of deviation from specification in a workpiece produced by a manufacturing process, the manufacturing process being performed by respective manufacturing equipment, the method comprising the steps of:

identifying a set of repeated portions of the workpiece, each instance of a repeated portion having a form, the form of one instance of a repeated portion being substantially similar to the form of the other instances;

for each instance of the repeated portion, making a set of measurements of the reproducible part relative to a respective reference datum;

comparing each set of measurements to a respective target range of values; and based on the comparison, inferring the existence of evidence of deviation from specification, wherein the measurements relate to a hierarchic set of forms characterizing the workpiece, each form corresponding to an action of the manufacturing equipment.

6. The method according to claim 5, wherein the hierarchic set of forms comprises two categories: a first category of forms characterizing the shape of a portion of the workpiece, and a second category of forms characterizing one or more portions of the workpiece.

7. The method according to claim 5, wherein the evidence of the deviation is a basis for indicating an alert condition.

8. The method according to claim 7, wherein the alert condition is based upon application of a preselected rule to the evidence.

9. The method according to claim 8, wherein the preselected rule comprises a deviation exceeding a threshold value.

10. The method according to claim 5, comprising the further step of storing the measurements in a computer data storage device.

11. The method according to claim 5, wherein at least a pair of instances of the repeated portion are contiguous in the workpiece.

12. The method according to claim 5, wherein the form comprises a shape of at least a portion of the workpiece.

13. A method for assessing a condition of a workpiece acted upon by manufacturing equipment, comprising the steps of:

identifying a set of forms, each form corresponding to an aspect of the action of the manufacturing equipment upon the workpiece;

for each form, making a plurality of measurements;

for each plurality of measurements, computing a respective deviation from a corresponding datum;

defining a deviation threshold; and if a computed deviation exceeds the deviation threshold, inferring the existence of the condition attributable to the action of the manufacturing equipment on the workpiece associated with action corresponding to the form for which the deviation exceeds the threshold, wherein the set of forms comprises two categories: a first category of forms that characterizes a geometric element of a portion of the workpiece, and a second category of forms that characterizes differences between workpieces.

14. The method according to claim 13, wherein the first category of forms comprises one selected from the group consisting of a point form, a path segment form, a path form and a surface form.

15. The method according to claim 13, further comprising the step of plotting the plurality of measurements for the plurality of forms on a single graph, prior to determining whether any computed deviation for each form exceeds a preselected threshold.

16. The method according to claim 15, wherein the graph comprises a representation of each plurality of measurements.

17. The method according to claim 15, wherein the graph comprises a representation of each plurality of measurements in relation to a respective form among a hierarchy of forms characterizing the workpiece, each form corresponding to an action of the manufacturing equipment.

18. The method according to claim 17, wherein the hierarchic set of forms comprises two categories: a first category of forms characterizing the shape of a portion of a workpiece, and a second category of forms characterizing one or more portions of the workpiece.

19. The method according to claim 15, wherein the single graph comprises a geometric deviation chart.

20. The method according to claim 19, wherein the geometric deviation chart comprises a first region for comparing measurements corresponding to the hierarchic set of geometric forms, and a second region contiguous with the first, for recording the frequency of repetition of the forms that comprise portions of the workpiece.

21. The method according to claim 13, wherein the condition comprises an alert condition.

22. The method according to claim 13, wherein the plurality of measurements comprises at least three measurements.

23. The method according to claim 22, wherein the at least three measurements comprise exactly three measurements.

24. A method for detecting deviations from an intended form in a mechanical part, the deviations based upon computed differences between measured geometric properties with respect to a reference datum and defined threshold values, the deviations from an intended form caused by a machine tool operating on the mechanical part, the method comprising the steps of:
    a. identifying a hierarchic set of geometric forms characterizing the mechanical part, each form corresponding to an action of the machine tool on the part;
    b. categorizing the geometric forms from a lowest order to a highest order;
    c. making a plurality of measurements corresponding to the lowest order form, each plurality of measurements made relative to a reference datum;
    d. computing deviations based on differences between the plurality of measurements and the reference datum;
    e. comparing the deviations with respective threshold values, the deviations exceeding threshold values indicating an alert condition; and
    f. if an alert condition is present, inferring a deviation from the intended form, wherein the hierarchic set of geometric forms comprises two categories: a first category of forms characterizing the shape of a portion of a workpiece forming the mechanical part, and a second category of forms characterizing one or more portions of the workpiece, wherein the second category of geometric forms comprises a surface defined by forms selected from the first category of shapes.

25. A method for detecting deviations from an intended form in a mechanical part, the deviations based upon computed differences between measured geometric properties with respect to a reference datum and defined threshold values, the deviations from an intended form caused by a machine tool operating on the mechanical part, the method comprising the steps of:
    a. identifying a hierarchic set of geometric forms characterizing the mechanical part, each form corresponding to an action of the machine tool on the part;
    b. categorizing the geometric forms from a lowest order to a highest order;
    c. making a plurality of measurements corresponding to the lowest order form, each plurality of measurements made relative to a reference datum;
    d. computing deviations based on differences between the plurality of measurements and the reference datum;
    e. comparing the deviations with respective threshold values, the deviations exceeding threshold values indicating an alert condition; and
    f. if an alert condition is present, inferring a deviation from the intended form, wherein the step of checking for an alert condition is performed by plotting the plurality of measurements on a geometric deviation chart.

26. The method according to claim 25, wherein the geometric deviation chart comprises a first region for comparing measurements corresponding to the hierarchic set of geometric forms, and a second region contiguous or adjacent the first, for representing the frequency of repetition of the forms that comprise portions of the workpiece.

27. The method according to claim 24, wherein if no alert condition is present, performing the steps c–f for a higher order geometric form.

28. method according claim 24, wherein the first category of geometric forms comprises at least one selected from the group consisting of a segment, a line and a plane.

29. method according to claim 24, wherein the first category of geometric forms comprises at least one of the groups consisting of curvilinear segment, a closed curve and a surface.

* * * * *